N. T. BACON.
PROCESS OF RECOVERING AMMONIUM CHLORIDE FROM SOLUTION.
APPLICATION FILED DEC. 27, 1919.
1,416,772. Patented May 23, 1922.
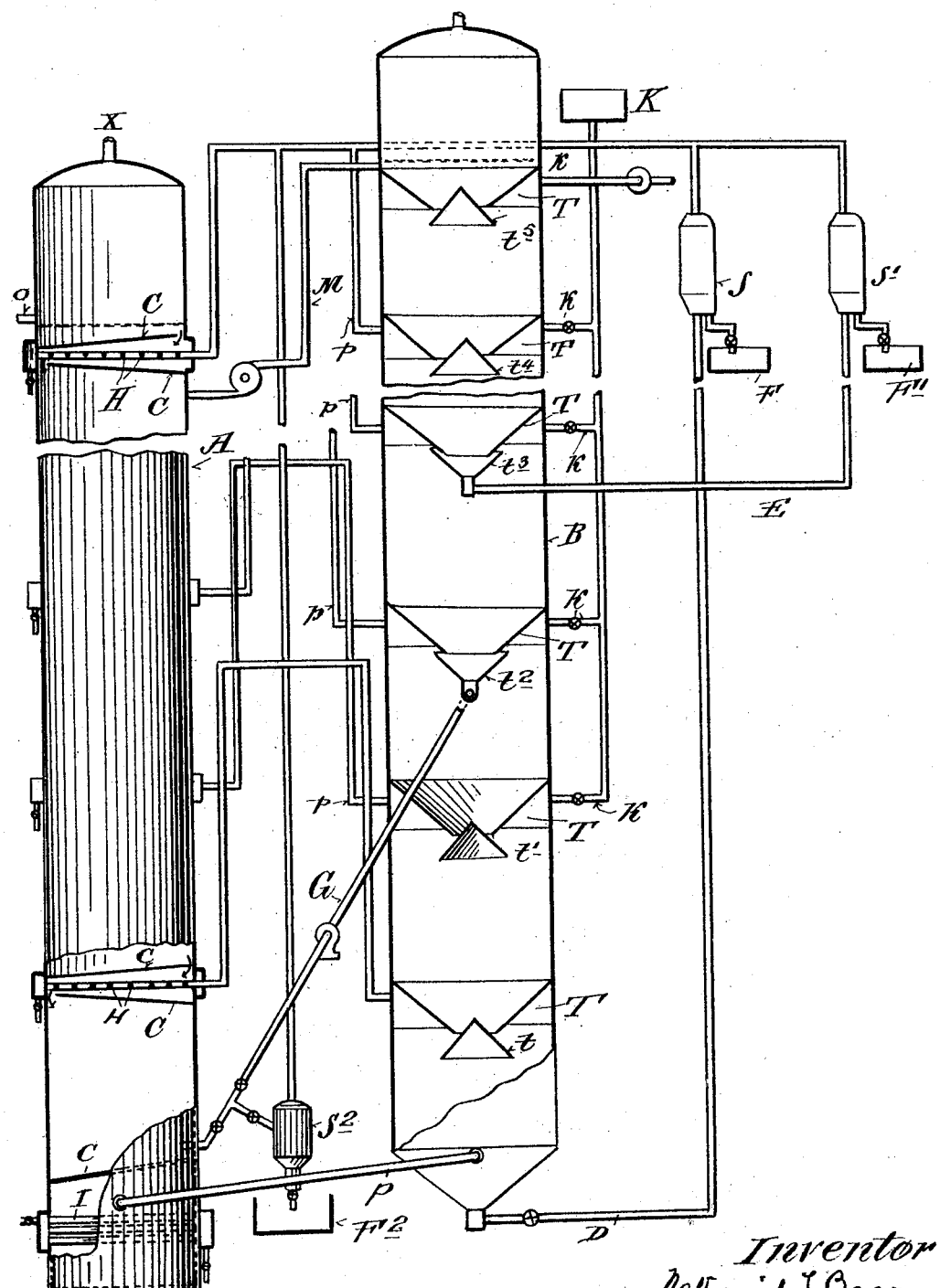

UNITED STATES PATENT OFFICE.

NATHANIEL T. BACON, OF PEACE DALE, RHODE ISLAND, ASSIGNOR TO THE SOLVAY PROCESS COMPANY, OF SOLVAY, NEW YORK, A CORPORATION OF NEW YORK.

PROCESS OF RECOVERING AMMONIUM CHLORIDE FROM SOLUTION.

1,416,772.   Specification of Letters Patent.   Patented May 23, 1922.

Application filed December 27, 1919. Serial No. 347,832.

*To all whom it may concern:*

Be it known that I, NATHANIEL T. BACON, a citizen of the United States, residing at Peace Dale, in the county of Washington and State of Rhode Island, have invented a new and useful Process of Recovering Ammonium Chloride from Solution, of which the following is a specification.

My invention relates particularly to the recovery of ammonium chloride from the mother liquors of the ammonia soda process, in which it is contained, together with varying quantities of sodium chloride and carbonate of ammonia, but practically free from other impurities.

The recovery of the ammonium chloride by boiling down the mother liquor is a matter of extreme difficulty, because of the dissociation of ammonium chloride after the free ammonia has been driven off and the consequent destructive corrosion of metallic surfaces, especially the heating pipes. Such part of the $NH_4Cl$ as does not break up tends to adhere to the heating tubes and thus reduces their efficiency to a small fraction of that of clean tubes.

The object of my improvements is to avoid these difficulties and at the same time provide for the separate recovery of the ammonium chloride and sodium chloride contained in the liquor treated. The invention will be best understood by reference to the accompanying drawing, which is a diagrammatic representation of an organization of apparatus which may be used for carrying the invention into effect.

Referring to the drawing, A, B, represent two towers located in operative relation, in the former of which the liquor to be treated is preheated, and in the latter is evaporated, so as to effect crystallization and precipitation of the contained salts. The preheating of the liquor in the preheating tower A, is effected by steam generated in the evaporating tower, B, and collected under steam traps, T, T, whence it passes by pipes $p$, $p$, to heating tubes or coils H, located at corresponding levels in the tower, A. The tower, A, is provided with baffles, C, C, to prevent as far as possible convection currents therein, and so arranged as, at the same time, to permit gases set free in the liquor to pass to the top of the tower.

The lower part of the tower, A, is connected with that of the tower, B, by a pipe P. The liquor at the bottom of the tower, B, is raised to the boiling point under the pressure of the column of liquor therein by means of live steam passing through a nest of heating pipes, I, located below the lowest baffle in the tower, A. The bottom of the tower, B, is located somewhat above the level of the heating tubes, I, so that the pressure of the column of liquid in the tower, A, is enough greater than that in the tower, B, to prevent boiling of the liquor in the tower, A, when the liquor in the lower part of the tower, B, is raised to the boiling point under the existing pressure.

In conducting the operation the liquor to be treated is admitted through pipe, O, to the preheating tower, A, and passes downward therethrough, being heated in its passage by steam from the steam traps, T, in the evaporating tower, B. In the preheater, A, a large part of the free ammonia and the $CO_2$ in the liquor are driven off and bubble up past the baffles, C. These gases will gradually accumulate in the feed at the top of the tower until they raise the strength of ammonia and $CO_2$ in the feed to a point at which very rich gas will be given off at the exit, X, at the top of the tower from which these gases can be carried back for use in the ammonia soda system, or they can be utilized in making commercial carbonate of ammonia, or otherwise, as desired. Enough free ammonia will, however, remain in the liquor in the preheater A, to prevent dissociation of ammonium chloride therein.

As the preheated liquor enters the evaporating tower, B, it has been heated to the boiling point at this level by steam in the heating tubes, I, located at the base of the tower, A. There will, however, be no fouling of these tubes since there is no precipitation of salts at this point. As the liquor flows into the base of the evaporating tower, B, it is not saturated with any salt, as both NaCl and $NH_4Cl$ increase in solubility by heating, and the only other salt present, which is a small amount of $Na_2SO_4$, existing as an impurity, can be kept below saturation at all times by bleeding off from time to time a portion of the mother liquor.

As the liquor enters the evaporating tower, B, it will meet crystals of NaCl falling from the upper levels, and will saturate itself therewith at once, so that it will immediately begin to throw down NaCl as it boils, but it will still be below saturation with NH$_4$Cl, the solubility of which increases rapidly with increasing temperature.

The NaCl precipitated in the bottom of the tower, B, is drawn off, as through pipe, D, by means of a steam separator, S, to filter F. It will be free from NH$_4$Cl except for adhering mother liquor which can be removed by washing.

In the upper portion of the evaporating tower, B, NH$_4$Cl only will be precipitated, since the rapidly decreasing temperature, due to relief of pressure, will throw down NH$_4$Cl far more rapidly than the precipitation caused by concentration of the solution, and the solubility of NaCl is increased so much by removal of NH$_4$Cl from solution that the solution as it approaches the top of the column recedes more and more from saturation with NaCl. The precipitated NH$_4$Cl is caught in an inverted cone, $t^3$ and carried off by steam separator, S', to a filter F'. Between the zones in which NaCl NH$_4$Cl are separately precipitated, both salts are precipitated together and these mixed salts are received in an inverted cone, $t^2$, located at such a point that none of the mixed salts will pass down into that portion of the tower in which NaCl alone is precipitated. This point will ordinarily be at about one fourth the distance from the bottom of the tower, though this will vary with variations in the amount of NaCl in solution. The mixed salts collected in the inverted cone, $t^2$, may be carried by pipe, G, and steam separator S$^2$ to a filter, F$^2$, or they may be delivered directly into the preheating tower, A, at a point near the bottom thereof where they will redissolve as the solution is saturated with neither salt at this point.

The small amount of free ammonia remaining in the liquor as it enters the tower, B, will be driven off in the lower part of the tower and will pass over in the steam from the lowermost of the traps, T, and will condense with the steam and be drawn off in the drip from which it can be recovered by distillation.

Any danger of destruction of the pipes by chlorine set free by dissociation of NH$_4$Cl above this point may be obviated by admitting ammonia to the tower, B, as from a tank K, through pipes $k$, $k$. The excess ammonia will, as above stated, pass over with the steam and be collected in and recovered from the drip.

As the liquor passes upward through the tower, B, it will continue to boil under reducing pressure and with decreased temperature. The steam generated, and collected under the traps, T, passes over to the heating tubes of corresponding level in the preheating tower, A, until a point is reached where the steam temperature is so near that of the liquor surrounding the condensing tubes that it will not be condensed by the feed in the tower, A. The steam from the traps above this point, as well as that from the top of the tower, B, is drawn off and condensed by means of vacuum pumps and cold water condensers (not shown in the drawing) as in the ordinary vacuum processes. The unevaporated liquor is returned from the top of the tower B, as by pipe M, to tower, A, where it is mixed with the fresh feed.

By means of my invention I am able to recover the ammonium chloride content of mother liquor of the ammonia soda process uncontaminated with other salts, and without injury to the apparatus employed, the advantages of which will be readily apparent to those skilled in the art.

What I claim as new and desire to secure by Letters Patent, is:—

1. The process of recovering ammonium chloride from a solution in which it is contained with sodium chloride, which consists in heating to the boiling point an upward moving column of the solution, and drawing off the generated steam from successive points of the column, separately precipitating sodium chloride in the lower portion of the column, and separately precipitating ammonium chloride in the upper portion of the column, and separately collecting and removing the precipitated salts.

2. The process of recovering ammonium chloride from a solution in which it is contained with sodium chloride, which consists in heating to the boiling point an upward moving column of the solution and drawing off the generated steam from successive points of the column, precipitating ammonium chloride in the upper portion of the column and collecting and removing the precipitate, precipitating mixed ammonium chloride and sodium chloride below the point at which the ammonium chloride is precipitated, and collecting and removing the precipitated mixed salts, and, below the point at which the mixed salts are collected, precipitating sodium chloride alone and removing the precipitate from the bottom of the column.

3. The process of recovering ammonium chloride from a solution in which it is contained with sodium chloride, which consists in heating an upwardly moving column of the solution to the boiling point, and progressively cooling and concentrating the solution by evaporation as it moves upward, separately precipitating sodium chloride in the hotter portion of the column and separately precipitating ammonium chloride in the cooler portion of the column.

4. The improvement in the process of recovering ammonium chloride from solution, which consists in heating a downward moving column of the solution without boiling so as to drive off a portion of the contained free ammonia and $CO_2$, and collecting and removing these at the top of the column, passing the solution in an upwardly moving column after heating it to the boiling point under the pressure of such column, progressively cooling and concentrating the solution by reduction of pressure and adding ammonia to the column at successive points.

5. The improvement in the process of recovering ammonium chloride from solution, which consists in heating a downward moving column of the solution without boiling so as to drive off a portion of the contained free ammonia and $CO_2$, and collecting and removing these at the top of the column, passing the solution in an upwardly moving column after heating it to the boiling point under the pressure of such column, progressively cooling and concentrating the solution by reduction of pressure, adding ammonia to the column at successive points, and removing the added ammonia with the steam generated in the column.

6. The process of recovering ammonium chloride from a solution in which it is contained with sodium chloride, which consists in heating a downward moving column of the solution without boiling so as to drive off a portion of the contained free ammonia and $CO_2$, and collecting and removing these at the top of the column, passing the solution in an upwardly moving column, after heating it to the boiling point under the pressure of such column, progressively cooling and concentrating the solution by reduction of pressure, adding ammonia to the column at successive points and separately precipitating and collecting sodium chloride and ammonium chloride in different parts of the column.

7. The improvement in the process of recovering ammonium chloride from solution which consists in evaporating the solution so as to precipitate ammonium chloride and at the same time maintaining free ammonia in the solution.

8. The improvement in the process of recovering ammonium chloride from a solution in which it is contained with sodium chloride which consists in heating a downward moving column of the solution without boiling, passing the solution in an upwardly moving column after heating it to the boiling point under the pressure of such column and drawing off the generated steam from successive points of said column, separately precipitating ammonium chloride in the upper portion of said column and separately precipitating sodium chloride in the lower portion of said column and, between the points at which ammonium chloride and sodium chloride are separately precipitated, precipitating mixed ammonium chloride and sodium chloride and transferring the mixed salts to the lower part of the first mentioned column so as to cause the solution at that point to approach saturation with both salts.

In testimony whereof I affix my signature this twentieth day of December, 1919.

NATHANIEL T. BACON.